Feb. 26, 1957

J. BÄBLER 2,783,434

APPARATUS FOR DETERMINING THE LOCATION
OF A FAULT ON ELECTRIC LINES
Filed Aug. 21, 1953

Inventor
Justus Bäbler,
By Pierce, Scheffler + Parker,
Attorneys.

United States Patent Office 2,783,434
Patented Feb. 26, 1957

2,783,434
APPARATUS FOR DETERMINING THE LOCATION OF A FAULT ON ELECTRIC LINES

Justus Bäbler, Baden, Switzerland, assignor to Aktiengesellschaft Brown, Boveri & Cie, Baden, Switzerland, a joint-stock company Application August 21, 1953, Serial No. 375,716

Claims priority, application Switzerland August 28, 1952

12 Claims. (Cl. 324—52)

The invention relates to a process and an arrangement for determining the location of faults in electric transmission lines.

In transmission equipment, for example in long overhead lines for the transmission of electric energy, breakdowns in the nature of line breaks or short circuits are to be expected. To facilitate the elimination of such faults, methods for ascertaining the location of faults are known from which the distance to the fault can be determined. In known processes, apparent resistance measurements are undertaken from which the location of the fault can be calculated. These calculations are often very intricate and make the practical applicability of these methods quite difficult. Methods are also known in which the distance to the fault is ascertained from the determination of the time of transmission of reflected impulses. Such measurements require large and complex apparatus similar to that of radar technique. Specially trained personnel is needed for its operation and this personnel must constantly stay in practice. These prerequisites are hard to satisfy at, for example, electrical power plants. The measuring methods according to the reflection process can be simplified when the line to be measured is excited with standing waves, wherein, from the resonance frequencies found and from the known speed of propagation, the distance of the location of the fault can be determined directly. In the method based upon excitation with standing waves, it is necessary to know whether the energization is solely by the fundamental wave or whether the harmonic frequencies are present. This requires a recording of the impedance characteristic over a wide frequency range.

Other difficulties with the known methods arise from interference voltages (static) which may be induced on the line from adjacent current-conducting lines and from impulse voltages arising from switching operations which occur almost continuously on a long transmission line.

Objects of the present invention are to provide improved processes of and apparatus for determining the location of a fault, and which are free from the limitations and the objections of the known processes.

Objects are to provide processes and apparatus for exciting a transmission line with a test voltage of progressively varying frequency, and for recording both the impedance of the line as seen by the applied test voltage and the phase relation of the test voltage and current. Other objects are to provide processes and apparatus of the type stated in which the recording voltages are direct current voltages derived from frequency-sensitive rectifiers having as one alternating current input a voltage of the test frequency, whereby interference voltages of other frequencies do not develop a direct current component which would result in a false recording.

These and other objects and the advantages of the invention will be apparent from the following specification when taken with the accompanying drawing in which.

Figure 2:
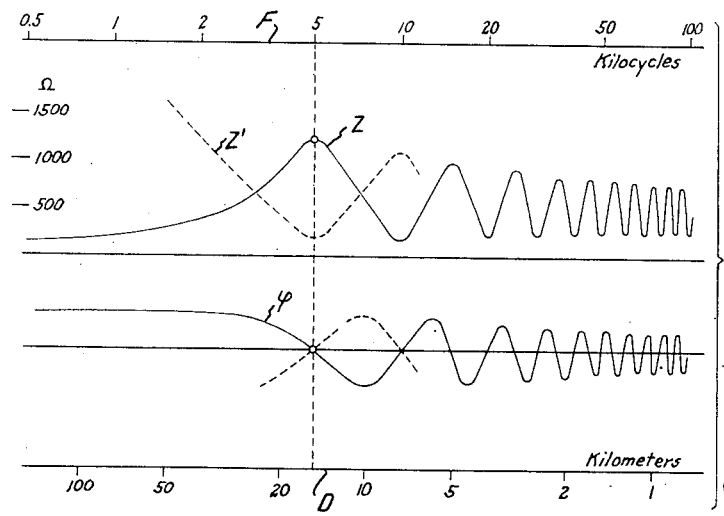
Fig. 2 is a typical recording made on a faulty transmission line.

The apparatus and the method of determining the distance to a fault may be best understood by first considering the curves of Fig. 2 which is a typical recording made in the testing of a homogeneous but faulty overhead transmission line, specifically a short-circuited line. The record sheet is provided with a logarithmic frequency scale F and a distance scale D, and a curve Z of the impedance of the line at an applied test voltage of progressively varying frequency is drawn upon the record sheet, also a curve φ of the phase of the test voltage with respect to the test current. From prior tests on the line when fault-free, it is known that the characteristic impedance of the line is 500 ohms.

As the test frequency is increased from a value of about 500 cycles per second, the line impedance increases at first until it reaches its first extreme value, a maximum, for example at 5 kilocycles, then drops to a minimum value and rises again to a peak at 15 kilocycles. The faulty line forms a transmission line, and the lowest frequency of excitation which develops an impedance peak is the fundamental frequency $f_0$ of excitation of the faulty line. From this frequency, the distance D up to short circuit or interruption is known to be ¼ of the wave length, that is $$D = \frac{1}{4}\frac{c}{f_0}$$

With the speed of propagation $c$ of 300,000 km./sec., the distance of the fault is found in this example to be:

$$D = \frac{1}{4} \cdot \frac{300{,}000 \text{ km./sec.}}{5000 \text{ 1/sec.}} = 15 \text{ kilometers}$$

The fact that the impedance value Z increases up to the fundamental frequency indicates that the fault is a short circuit, or at any rate a leak, whose resistance value is smaller than the 500 ohm characteristic impedance of the fault-free line. If the fault were an open circuit, then a reduction of the impedance value would follow and the plotted curve would correspond approximately to the dotted line Z'. If, by chance, the fault were a leak equal to the characteristic impedance of the line, then no reflections would occur at the fault and thereby no impedance changes would be recorded, and it would not be possible to determine the location of the fault.

The internal resistance of the generator of the test voltage is large and the test current is substantially constant, whereby the measured voltage values correspond approximately to the impedance of the line.

One advantage of the logarithmetic scale of frequencies is that the appearance of the impedance curve Z becomes independent of the frequency position, and this facilitates an interpretation of the curve. By recording the phase angle between the test voltage and the current J, a check is obtained on the fundamental frequency since the phase angle passes through zero at frequencies at which the faulty line is resonant, i. e. at maxima and minima of the measured test voltage.

Figure 1:
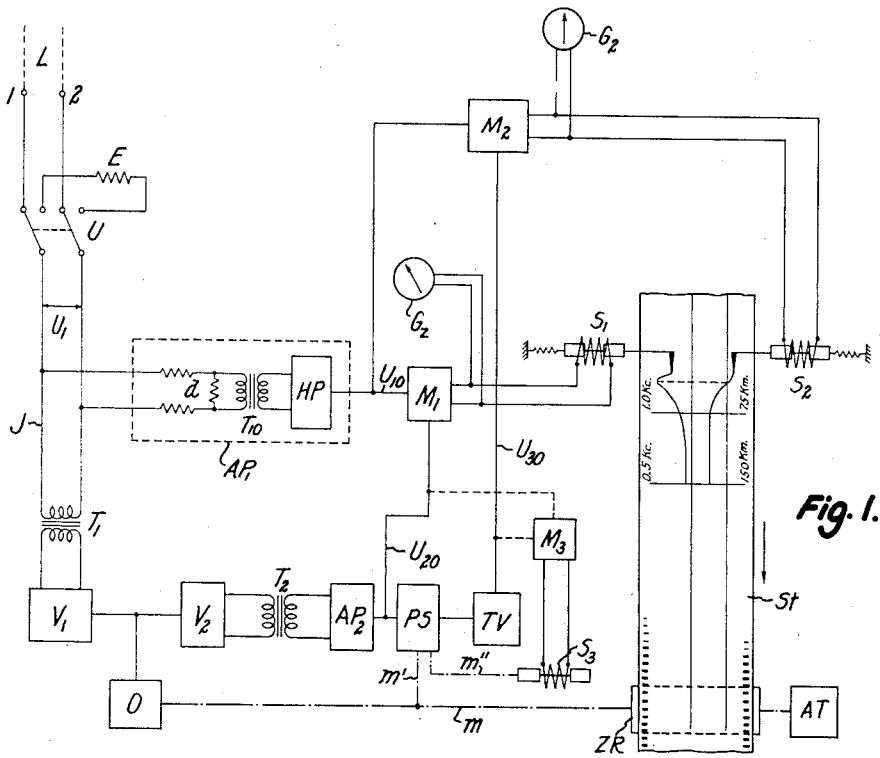
Fig. 1 is a schematic view of apparatus embodying the invention.

In the constructional example illustrated in Fig. 1, an oscillator O of progressively varying frequency works into two amplifiers $V_1$ and $V_2$ which are similar to each other in frequency and phase characteristics. The frequency adjustment of the oscillator is effected by a motor AT which also drives the record strip St. The frequency of the oscillator changes logarithmically with the adjustment in a frequency range of approximately 500 cycles to 100 kilocycles. In the case of measurements of overhead lines this corresponds to the measuring range of the distance to a fault of between 150 kilometers and 0.7 kilometer. The output of the amplifier $V_1$ is applied to the terminals 1 and 2 of the line L, or alternatively to a checking resistor E of known magnitude, by means of the switch U and a separation and protection transformer $T_1$. The amplifier $V_1$ has a high internal resistance so that the test current J established in the line is substantially independent of the test voltage $U_1$ on the line and this voltage can be considered as a measure of the impedance of the line.

The voltage $U_1$ develops a voltage $U_{10}$ over a transformer $T_{10}$ and an impedance matching network $AP_1$, which voltage $U_{10}$ is applied to the frequency-sensitive modulator $M_1$ which works into the writing coil $S_1$ of a recorder and also into the measuring instrument $G_z$ which indicates the instantaneous value of voltage $U_{10}$ while the pen or stylus of coil $S_1$ plots this value as impedance curve Z, in relationship to the frequency, on the paper strip St. This paper strip is moved forward by the sprocket wheel ZR of the paper feeding device in properly timed relation to the changing oscillator frequency by the driving motor AT.

The voltage output $U_{10}$ of the network $AP_1$ is also impressed upon the ring modulator $M_2$ which works into the writing coil $S_2$ of a second recorder and into a galvanometer $G_2$ which has a zero center position corresponding to zero value of the phase angle as it changes from lagging to leading, and vice versa.

The frequency-sensitive modulators $M_1$ and $M_2$ may be bridge assemblies of crystal rectifiers or barriers layer rectifiers such as described in Cowan Patent No. 2,025,158, as such ring modulators act as frequency and phase-sensitive rectifiers to develop a direct current output when alternating voltages of the same frequency are impressed upon the input circuits of the modulator. In the use of a ring modulator to rectify an "unknown" alternating voltage impressed upon one input circuit, an auxiliary voltage of the same frequency and usually of a fixed and relatively high magnitude is impressed upon the other input circuit. The auxiliary voltage renders the individual rectifier elements conductive in sequence, and the output is a direct current voltage which varies in magnitude and polarity with the phase relation of the "unknown" voltage to the auxiliary voltage.

Auxiliary voltages $U_{20}$ and $U_{30}$ for energization of the modulators $M_1$ and $M_2$ respectively are derived from the oscillator O through the amplifier $V_2$, transformer $T_2$ and an impedance matching network $AP_2$. Both alternating voltage inputs to the ring modulators are of the same instantaneous frequency since both are derived from the oscillator O, and the transmission characteristics of both paths to the modulator $M_1$ are so chosen or adjusted that voltages $U_{10}$ and $U_{20}$ at the modulator $M_1$ are in phase throughout the entire frequency range when the impedance at line terminals 1 and 2 is purely ohmic, a condition which always exists at moments when the line is resonant at the instantaneous test frequency. The auxiliary voltage $U_{30}$ for application to the modulator $M_2$ is developed over a phase-shifter PS and applied through a separation amplifier TV which prevents an overloading of the phase-shifter. The phase-shifter PS is continuously adjusted mechanically by the motor AT, as indicated by the broken lines $m$ and $m'$ to develop a phase shift of substantially 90° between the voltages $U_{20}$ and $U_{30}$. At instants of resonance on the line, the voltages $U_{10}$ and $U_{30}$ are therefore displaced by 90°, the output from the modulator $M_2$ is exactly zero, and the recorded phase curve $\phi$ passes through zero.

The voltage $U_1$ across the line includes components due to interference voltages, and the transformers $T_1$ and $T_{10}$ serve to protect the apparatus from such interference voltages. To avoid overstressing of the ring modulators, a high pass filter HF is provided between the transformer $T_{10}$ and the ring modulators, the filter being designed to pass test currents of 500 cycles and over with little or no attenuation and to limit the transmission of the power current of 50 cycles and its harmonics to values which can be carried by the modulators. Adjustable damping impedances $d$ may be provided to reduce the variation of phase angle with changing line impedance.

The voltage $U_{30}$ must be shifted exactly 90° from the voltage $U_{20}$ if the zero values of the phase angle are to be recorded accurately. It would be difficult and expensive to construct a phase-shifter PS which could be adjusted mechanically by the motor AT with this precision, and it is preferable to rely upon the mechanical adjustment to effect only an approximately accurate phase-shift of 90° and to provide an electrical adjustment to correct the small errors in the mechanical adjustment.

For this purpose, the voltages $U_{20}$ and $U_{30}$ are impressed upon a further ring modulator $M_3$ which develops a direct current output that varies in magnitude and in sense with the extent and the direction of the departure of the phase-shift from exactly 90°. The modulator output is applied to a solenoid $S_3$ which operates through a mechanical connection $m''$ to effect the fine adjustment of the phase-shifter PS.

The method of employing the apparatus is as follows: in the event of a fault on the line L, the test apparatus is energized and warmed up at oscillator frequency of low value, for example 500 cycles per second, switch U is adjusted to connect amplifier $V_1$ to line L, and the motor AT is switched in when the oscillator is in stable operating condition. The amplifier $V_1$ has a high internal resistance so that the current J on the line is practically constant and in phase with test voltage developed by the oscillator O. The reaction of the voltage reflected from the fault point upon the input voltage results in a periodically changing phase-shift of the resulting voltage $U_1$ as compared to the constant current J. By symmetry of construction and of the transmission characteristics of the circuit elements, the phase angle between the voltages $U_{10}$ and $U_{20}$ at the ring modulator $M_1$ is equal to the phase angle between the test voltage $U_1$ and the test current J. Although the voltages $U_1$ and $U_{10}$ contain components of interference voltages, the auxiliary voltages $U_{20}$ and $U_{30}$ impressed upon the ring modulators are free from extraneous components and the resulting direct current outputs do not contain components derived from the interference voltages. Clear recordings of impedance and phase angle are thus obtained in spite of interference voltages which are usually present on an electrical transmission line and which may be of substantial magnitudes.

Assuming that the recording is as illustrated in Fig. 2, the first impedance peak is at 5 kilocycles, and resonance of the faulty line at this frequency is also shown by the fact that the test voltage is in phase with the test current at this frequency. The distance to the fault is computed to be 15 kilometers, as above described, or it may be read directly from the distance scale D. At increase of the test frequency, the impedance curve Z decreases to a minimum at 10 kilocycles, which is also a point of zero phase angle, and then increases to a maximum at 15 kilocycles. The voltage peaks which are indicative of resonance are thus repeated at intervals of 10 kilocycles on the frequency scale F.

The masses of the moving systems of the recorders are so selected or adjusted as to exhibit considerable inertia or time lag, thus responding readily to rectified voltages of the fundamental frequency but less readily to the voltage pulses resulting from rectification of the harmonics of the test voltages. The sensitivity of the recorders is thus a maximum for the recording of the line impedance at the fundamental frequency, and it decreases rapidly with the harmonics of increasing orders. While this selection of moving systems of appreciable inertia introduces a phase or time lag into the recording, this lag is constant over the frequency range and may be compensated by an appropriate correction of the feed of the record strip.

I claim:
1. In the determination of the distance to a fault on a transmission line, the steps which comprise exciting the line with a test voltage, progressively increasing the frequency of the test voltage at a logarithmic rate whereby the magnitude of the test voltage and its phase relation to the test current vary with frequency due to reflection from the fault, and recording the magnitude and phase of the test voltage on logarithmic scales.

2. In the determination of the distance to a fault on a transmission line by exciting the line with a test voltage of progressively increasing frequency from a source of high internal impedance, and recording the variations with frequency of the magnitude of the test voltage and its phase relation to the test current, the method of eliminating errors from extraneous voltages which comprises connecting the line to one input circuit of a ring modulator to impress thereon a voltage of the test voltage frequency admixed with components developed by the said extraneous voltages, energizing a second input circuit of the ring modulator with an auxiliary voltage consisting solely of the test voltage frequency, whereby the output of the modulator consists solely of direct current varying in magnitude and sense with the voltage of test frequency on the line, and recording said modulator output as a measure of the impedance of said line at the test voltage frequency.

3. Apparatus for determining the location of a fault on a transmission line; said apparatus comprising a tunable oscillator and drive means for progressively varying the frequency thereof, an amplifier of high internal impedance working out of said oscillator, means for connecting the output of said oscillator to the transmission line, a pair of frequency-sensitive modulators each having a pair of alternating current input circuits and a direct current output circuit, circuit means for impressing the line voltage upon an input circuit of each modulator, circuit elements working out of said oscillator for impressing auxiliary voltages of the instantaneous test frequency upon the second input circuit of the respective modulators, said circuit elements having transmission characteristics maintaining the auxiliary voltage on one modulator in phase with the test current established in said transmission line and the auxiliary voltage on the other modulator continuously displaced by 90° from the test current established in the transmission line, whereby the direct current output of said one modulator is a measure of the impedance of the transmission line and the direct current output of said other modulator is a measure of the phase relation of the test voltage to the said test current, a record strip, means for displacing said record strip in synchronism with the variation in oscillator frequency, and means for recording the direct current output of each modulator on said record strip.

4. Apparatus as recited in claim 3, wherein said drive means adjusts said tunable oscillator to increase the frequency at a logarithmetic rate.

5. Apparatus as recited in claim 3, wherein a single motor constitutes said drive means for varying the frequency of the oscillator and said means for displacing said record strip.

6. Apparatus as recited in claim 5, wherein said circuit elements for impressing an auxiliary voltage on said other modulator include an adjustable phase-shifter ganged mechanically to said motor.

7. Apparatus as recited in claim 6, wherein said mechanical ganging of said phase-shifter to said motor effects a coarse adjustment of the phase-shifter to effect an approximately 90° displacement between the input and output voltages thereof, in combination with electromechanical means energized by the phase-shifter input and output voltages for automatically adjusting the phase-shifter to correct any departure from an exact 90° phase displacement.

8. Apparatus as recited in claim 6, in combination with a separation amplifier between said phase-shifter and said other modulator.

9. Apparatus as recited in claim 3, wherein said circuit means for impressing the line voltage on said modulators includes a series arrangement of attenuation means, a transformer and a high pass filter.

10. Apparatus as recited in claim 3, wherein one of said modulators comprises a ring modulator consisting of a bridge arrangement of barrier layer rectifiers.

11. Apparatus as recited in claim 3, wherein said one modulator is a push-pull tube modulator with control grids normally biased to block conduction when subjected to either the transmission line voltage or said auxiliary voltage, and said circuit elements impress said auxiliary voltage on said control grids to condition the modulator for conductance when simultaneously subjected to said transmission line voltage.

12. Apparatus as recited in claim 3, wherein said recording means have moving elements of appreciable mass having a maximum sensitivity to rectified currents of the instantaneous test frequency and a substantially lesser sensitivity to rectified currents of harmonics of the instantaneous test frequency.

References Cited in the file of this patent

UNITED STATES PATENTS

| | | |
|---|---|---|
| 2,258,677 | Dresser | Oct. 14, 1941 |
| 2,499,001 | Green | Feb. 28, 1950 |